(12) United States Patent
Zhuang et al.

(10) Patent No.: US 10,114,437 B2
(45) Date of Patent: Oct. 30, 2018

(54) PORTABLE DEVICE AND CALIBRATION METHOD THEREOF

(71) Applicant: MediaTek Inc., Hsin-Chu (TW)

(72) Inventors: Yi-Chang Zhuang, Zhubei (TW); Lee-Kee Yong, Hsinchu (TW); Wu-an Kuo, Hsinchu (TW); Yi-Ping Kao, Taichung (TW); Alice Wang, Allen, TX (US); Uming Ko, Houston, TX (US)

(73) Assignee: MEDIATEK INC., Hsin-Chu (TW)

( * ) Notice: Subject to any disclaimer, the term of this patent is extended or adjusted under 35 U.S.C. 154(b) by 85 days.

(21) Appl. No.: 15/221,919

(22) Filed: Jul. 28, 2016

(65) Prior Publication Data
US 2017/0031405 A1 Feb. 2, 2017

Related U.S. Application Data

(60) Provisional application No. 62/198,312, filed on Jul. 29, 2015.

(51) Int. Cl.
*G06F 1/28* (2006.01)
*H04B 1/3827* (2015.01)
*G06F 9/4401* (2018.01)
*G06F 1/10* (2006.01)

(52) U.S. Cl.
CPC .................. *G06F 1/28* (2013.01); *G06F 1/10* (2013.01); *G06F 9/4403* (2013.01); *H04B 1/3827* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 2003/0034791 A1* | 2/2003 | Huang | G01R 31/3187 324/750.3 |
| 2004/0128567 A1* | 7/2004 | Stewart | G06F 1/3203 713/300 |
| 2005/0137816 A1* | 6/2005 | Chuang | H03L 7/099 702/106 |
| 2005/0188230 A1* | 8/2005 | Bilak | G06F 1/3203 713/300 |

(Continued)

*Primary Examiner* — Zahid Choudhury
(74) *Attorney, Agent, or Firm* — McClure, Qualey & Rodack, LLP (57) ABSTRACT

A portable device is provided. A first processor performs an initial procedure according to an operation clock with a first frequency value and an operation voltage with a first voltage value, and performs a calibration procedure according to the operation clock with a second frequency value and the operation voltage with a second voltage value when the initial procedure has been performed and a self-calibration event is present. A second processor detects whether a specific function of the calibration procedure is being performed by the first processor. The second processor stores the second frequency value and the second voltage value into a storage unit after the calibration procedure is performed. The second voltage value is lower than the first voltage value, and the second frequency value is lower than the first frequency value.

20 Claims, 4 Drawing Sheets

(56) References Cited

U.S. PATENT DOCUMENTS

| | | | |
|---|---|---|---|
| 2005/0289367 A1* | 12/2005 | Clark | G06F 1/26 |
| | | | 713/300 |
| 2008/0256382 A1* | 10/2008 | Jacobowitz | G06F 1/10 |
| | | | 713/501 |
| 2010/0095137 A1* | 4/2010 | Bieswanger | G06F 1/3203 |
| | | | 713/300 |
| 2012/0119777 A1* | 5/2012 | von Kaenel | G06F 1/3203 |
| | | | 324/762.02 |
| 2013/0117582 A1* | 5/2013 | Satyamoorthy | G06F 1/324 |
| | | | 713/300 |
| 2014/0201570 A1* | 7/2014 | Bielman | G06F 11/079 |
| | | | 714/23 |
| 2015/0177824 A1* | 6/2015 | Ganpule | G06F 1/3296 |
| | | | 713/322 |

* cited by examiner

| | V1_0 |
| --- | --- |
| | V1_1 |
| | V1_2 |
| VDD1 | V1_3 |
| | ⋮ |
| | V1_n |
| | F1_0 |
| | F1_1 |
| | F1_2 |
| CLK1 | F1_3 |
| | ⋮ |
| | F1_m |

FIG. 4

PORTABLE DEVICE AND CALIBRATION METHOD THEREOF

CROSS REFERENCE TO RELATED APPLICATIONS

This Application claims priority of U.S. Provisional Application No. 62/198,312, filed on Jul. 29, 2015, the entirety of which is incorporated by reference herein.

BACKGROUND OF THE INVENTION

Field of the Invention

The invention relates to a portable device, and more particularly to a calibration method of a portable device.

Description of the Related Art

In general, a portable device like a smartphone comprises a plurality of components disposed on a printed circuit board (PCB) within the portable device. When the components of the portable device become damaged and/or aged, or power-supply variations occur in the PCB, the portable device can become unstable, and the operational characteristics of the portable device may not conform to the original design specifications. Furthermore, the operational characteristics of one component are also different for various manufacturers.

Therefore, a calibration procedure for a portable device is desired.

BRIEF SUMMARY OF THE INVENTION

A portable device and calibration methods thereof are provided. An embodiment of a portable device is provided. The portable device comprises a first processor, a storage unit, and a second processor. The first processor performs an initial procedure according to an operation clock with a first frequency value and an operation voltage with a first voltage value, and performs a calibration procedure according to the operation clock with a second frequency value and the operation voltage with a second voltage value when the initial procedure has been performed and a self-calibration event is present. The second processor detects whether a specific function of the calibration procedure is being performed by the first processor. The second processor stores the second frequency value and the second voltage value into the storage unit after the calibration procedure is performed. The second voltage value is lower than the first voltage value, and the second frequency value is lower than the first frequency value.

Furthermore, an embodiment of a calibration method for a portable device is provided. A specific function of a calibration procedure is performed by a first processor of the portable device using a first operation voltage, when the portable device is powered on and a self-calibration event is present. The first processor decreases the first operation voltage via a power module of the portable device. The specific function of the calibration procedure is performed by the first processor with the decreased first operation voltage until the decreased first operation voltage is equal to a threshold value. The first processor is reset by a second processor of the portable device when the specific function of the calibration procedure has been performed with the decreased first operation voltage equal to the threshold value or the specific function of the calibration procedure has not been completed during a specific time period. The first processor is reset to perform a normal boot procedure.

Moreover, another embodiment of a calibration method for a portable device is provided. An initial procedure is performed according to a first operation voltage, via a first processor of the portable device, when the portable device is powered on. A specific function of a calibration procedure is performed by the first processor according to a second operation voltage when the initial procedure is performed and a self-calibration event is present. The second operation voltage is decreased by the first processor, when the specific function of the calibration procedure has been performed. The specific function of the calibration procedure is performed again by the first processor according the decreased second operation voltage when the decreased second operation voltage is greater than a threshold value. It is detected whether the decreased second operation voltage is equal to the threshold value, by a second processor of the portable device. The second processor detects whether the specific function of the calibration procedure has been completed during a specific time period. The first processor is reset by the second processor when the specific function of the calibration procedure has been performed according to the decreased second operation voltage equal to the threshold value or the specific function of the calibration procedure has not been completed during the specific time period. The first processor is reset to perform a normal boot procedure.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
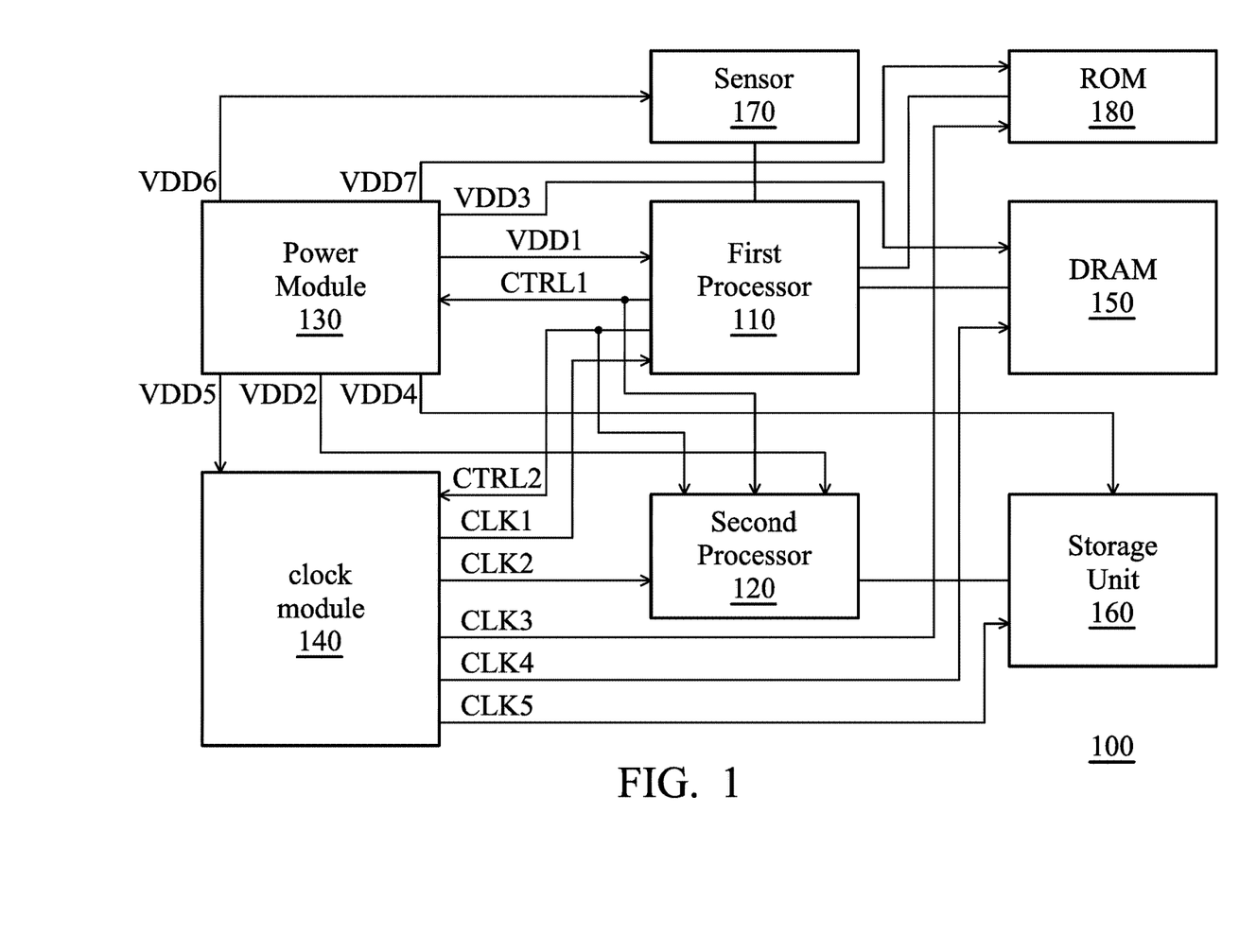
FIG. 1 shows a portable device according to an embodiment of the invention.

FIG. 1 shows a portable device 100 according to an embodiment of the invention. The portable device 100 comprises a first processor 110, a second processor 120, a power module 130, a clock module 140, a dynamic random access memory (DRAM) 150, a storage unit 160, a sensor 170, and a read only memory (ROM) 180. The power module 130 is capable of providing various operation voltages to the circuits of the portable device 100. For example, the power module 130 can provide a plurality of operation voltages VDD1-VDD7 to the first processor 110, the second processor 120, the DRAM 150, the storage unit 160, the clock module 140, the sensor 170, and the ROM 180, respectively. In one embodiment, the power module 130 may be a power management integrated circuit (PMIC). Similarly, the clock module 140 is capable of providing various operation clocks to the circuits of the portable device 100. For example, the clock module 140 can provide the operation clocks CLK1-CLK5 to the first processor 110, the second processor 120, the ROM 180, the DRAM 150, and the storage unit 160, respectively. In order to simplify the description, the clock signals provided to the other circuits of the portable device 100 will not be described. In one embodiment, the clock module 140 may be a clock generator comprising a phase-locked loop (PLL) circuit. The DRAM 150 is used to store a program code corresponding to a calibration procedure of the portable device 100.

In FIG. 1, the first processor 110 is a central processing unit (CPU) capable of performing various applications and programs of the portable device 100. When the sensor 170 detects that a power key of the portable device 100 has been pressed for longer than a specific period of time, the sensor 170 will notify the first processor 110, and then the first processor 110 can determine that the portable device 100 is powered on. In some embodiments, the sensor 170 also detects an ambient temperature when the power key of the portable device 100 has been pressed more than the specific time. Next, the first processor 110 obtains a boot code from the ROM 180, and performs an initial procedure in response to the boot code, so as to perform initial setting for the circuits of the portable device 100. For example, in the initial procedure, the power module 130 provides the operation voltage VDD1 with an initial voltage value V1_0 to the first processor 110, and also provides the operation voltage VDD2 to the second processor 120, and so on. Furthermore, in the initial procedure, the clock module 140 provides an operation clock CLK1 with an initial frequency value F1_0 to the first processor 110, and also provides an operation clock CLK2 to the second processor 120, and so on. After the initial procedure is completed, the first processor 110 determines whether a calibration procedure needs to be performed. If a self-calibration event is present, the first processor 110 will perform the calibration procedure. In the calibration procedure, the first processor 110 can determine which circuit will be activated to perform a specific function. It should be noted that the power module 130 and the clock module 140 are always activated when the portable device 100 is powered on. Furthermore, the first processor 110 respectively provides the control signal CTRL1 and CTRL2 to the power module 130 and the clock module 140 according to the program code stored in the DRAM 150, so as to decrease the operation voltages VDD1 and VDD3-VDD7 and the operation clocks CLK1 and CLK4-CLK5 for the activated circuits. For example, in response to the control signal CTRL1, the power module 130 provides the operation voltage VDD1 with a voltage value V1_1 to the first processor 110, wherein the voltage value V1_1 is lower than the initial voltage value V1_0 for the operation voltage VDD1. Similarly, in response to the control signal CTRL2, the clock module 140 provides the operation clock CLK1 with a frequency value F1_1 to the first processor 110, wherein the frequency value F1_1 is slower than the initial frequency value F1_0 for the operation clock CLK1. In one embodiment, only the operation voltage VDD1 and the operation clock CLK1 of the first processor 110 are decreased in the portable device. It should be noted that the operation voltage VDD2 and the operation clock CLK2 of the second processor 120 will not be changed in the calibration procedure.

In the calibration procedure, according to the decreased operation clocks CLK1 and CLK3-CLK5 and the decreased operation voltages VDD1 and VDD3-VDD7, the first processor 110 can control the activated circuits of the portable device 100 to perform a specific function or test with worst operating conditions regarding power of the first processor 110, the current induced by the specific function, temperature, and so on, so as to obtain the voltage values of the operation voltages and the frequency values of the operation clocks that the portable device 100 can operate normally. In some embodiments, the specific function is capable of accessing a memory (e.g. the ROM 180, the DRAM 150, or the storage unit 160), performing a specific algorithm, and so on. Simultaneously, the second processor 120 is enabled to monitor the status of the calibration procedure according to the operation voltage VDD2 and the operation clock CLK2, so as to record the obtained voltage values of the operation voltages and the obtained frequency values of the operation clocks so that the portable device 100 can operate normally. For example, when detecting that the first processor 110 completes the specific function of the calibration procedure according to the operation voltage VDD1 with the voltage value V1_1 and the operation clock CLK1 with the frequency value F1_1, the second processor 120 records/stores the voltage values of the decreased operation voltages and the frequency values of the decreased operation clocks into the storage unit 160, such as the voltage value V1_1, and the frequency value F1_1. Simultaneously, the first processor 110 provides the control signal CTRL1 and CTRL2 to the power module 130 and the clock module 140 again, so as to decrease the current operation voltages VDD1-VDD7 and/or the current operation clocks CLK1-CLK5 for the activated circuits and to perform the calibration procedure again until the calibration procedure has succeeded or failed. For example, in response to the control signal CTRL1, the power module 130 decreases the operation voltage VDD1 to a voltage value V1_2 from the voltage value V1_1. Similarly, in response to the control signal CTRL2, the clock module 140 slows the operation clock CLK1 from the frequency value F1_1 to a frequency value F1_2.

Once the first processor 110 completes the specific function of the calibration procedure, the second processor 120 will store the current voltage values of the operation voltages and the current frequency values of the operation clocks into the storage unit 160. Conversely, if the second processor 120 detects that the specific function of the calibration procedure has not been completed during a specific time period, the second processor 120 will reset the first processor 110. Thus, the portable device 100 is restored to perform a normal boot procedure according to the operation voltage values and the frequency values stored in the storage unit 160, wherein the operation voltage values and the frequency values stored in the storage unit 160 are stable settings for normal operations and programs of the portable device 100.

Figure 2:
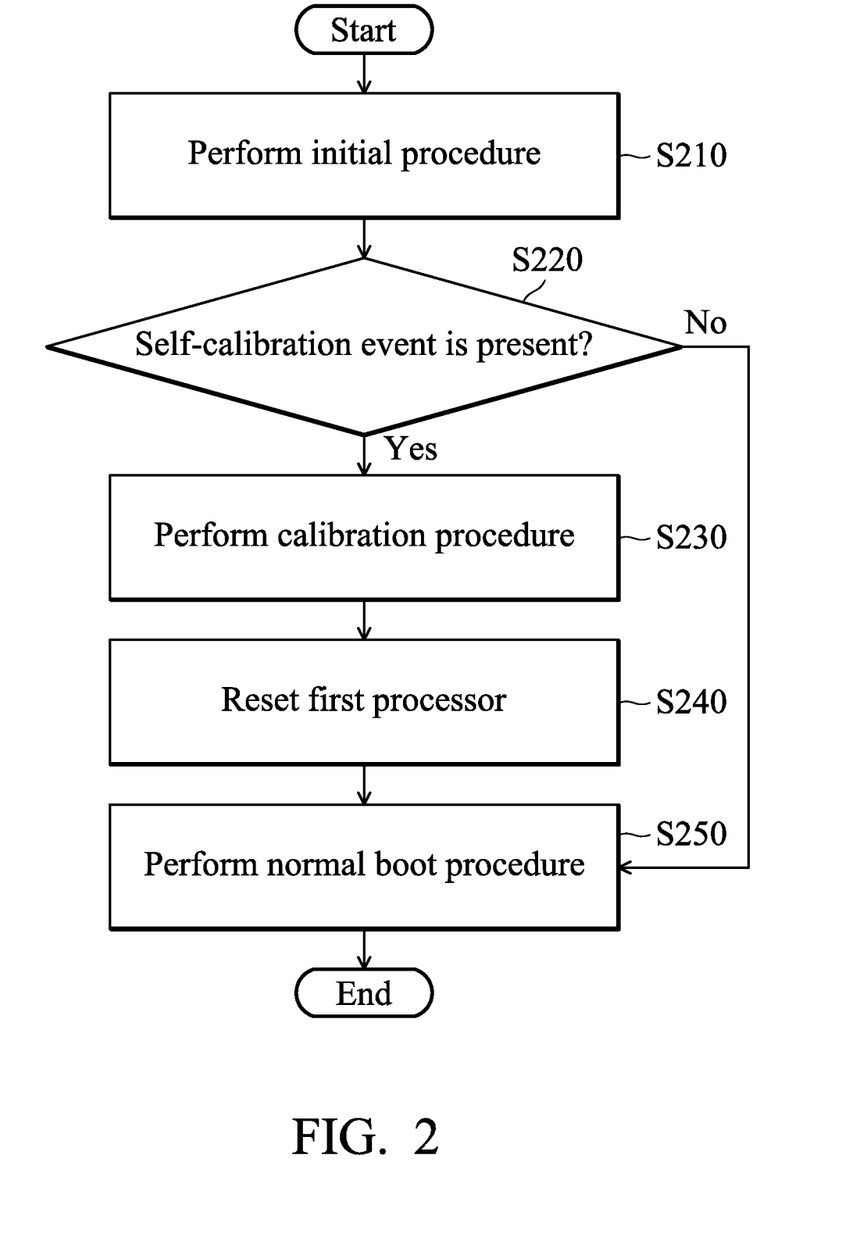
FIG. 2 shows a calibration method for a portable device according to an embodiment of the invention.

FIG. 2 shows a calibration method for a portable device according to an embodiment of the invention. Referring to FIG. 1 and FIG. 2 together, first, in step S210, when the portable device 100 is powered on, the first processor 110 performs an initial procedure (step S210) to perform initial setting for the circuits of the portable device 100. As described above, the first processor 110 can determine that the portable device 100 is powered on when the sensor 170 detects that a power key of the portable device 100 has been pressed for longer than a specific period of time. Furthermore, in the initial procedure, the operation voltages and the operation clocks of the related circuits are set to the initial values. For example, for the first processor 110, the operation voltage VDD1 provided by the power module 130 is set to an initial voltage value V1_0, and the operation clock CLK1 provided by the clock module 140 is set to an initial frequency value F1_0. After the initial procedure has been completed, the first processor 110 determines whether a calibration procedure is needed by detecting whether a self-calibration event is present (step S220). In some embodiments, the self-calibration event is present when the first processor 110 detects that a time interval between a previous initial procedure and the initial procedure of step S210 exceeds a specific time interval (e.g. one day, or one week, etc.), wherein the previous initial procedure is performed when the portable device 100 is powered on last. In some embodiments, the self-calibration event is present when the first processor 110 detects that an ambient temperature sensed by the sensor 170 is outside a specific temperature range, i.e. the ambient temperature is higher than a high-threshold temperature or lower than a low-threshold temperature. If the self-calibration event is absent, the first processor 110 can perform a normal boot procedure (step S250), i.e. the calibration procedure will not be performed. Conversely, if the self-calibration event is present, the calibration procedure is performed (step S230), wherein the calibration procedure will be described below. In the calibration procedure, a specific function is performed to verify whether the target circuits of the portable device 100 are normal according to an operation condition regarding the operation voltages and the operation clocks of the target circuits. In general, the first processor 110 is a master processor, and the main processor is a main target circuit to be verified, so as to obtain the stable operation condition for the first processor 110. In one embodiment, the first processor 110 is used to perform the specific function, and the second processor 120 is used to monitor the operation status of the specific function. After detecting that the calibration procedure has succeeded or failed, the second processor 120 will reset the first processor 110 (step S240) to restore the portable device 100, and then the first processor 110 can perform a normal boot procedure (step S250). After the normal boot procedure is performed, the first processor 110 can perform various normal applications according to the operation voltages and the operation clocks in the operation condition.

Figure 3:
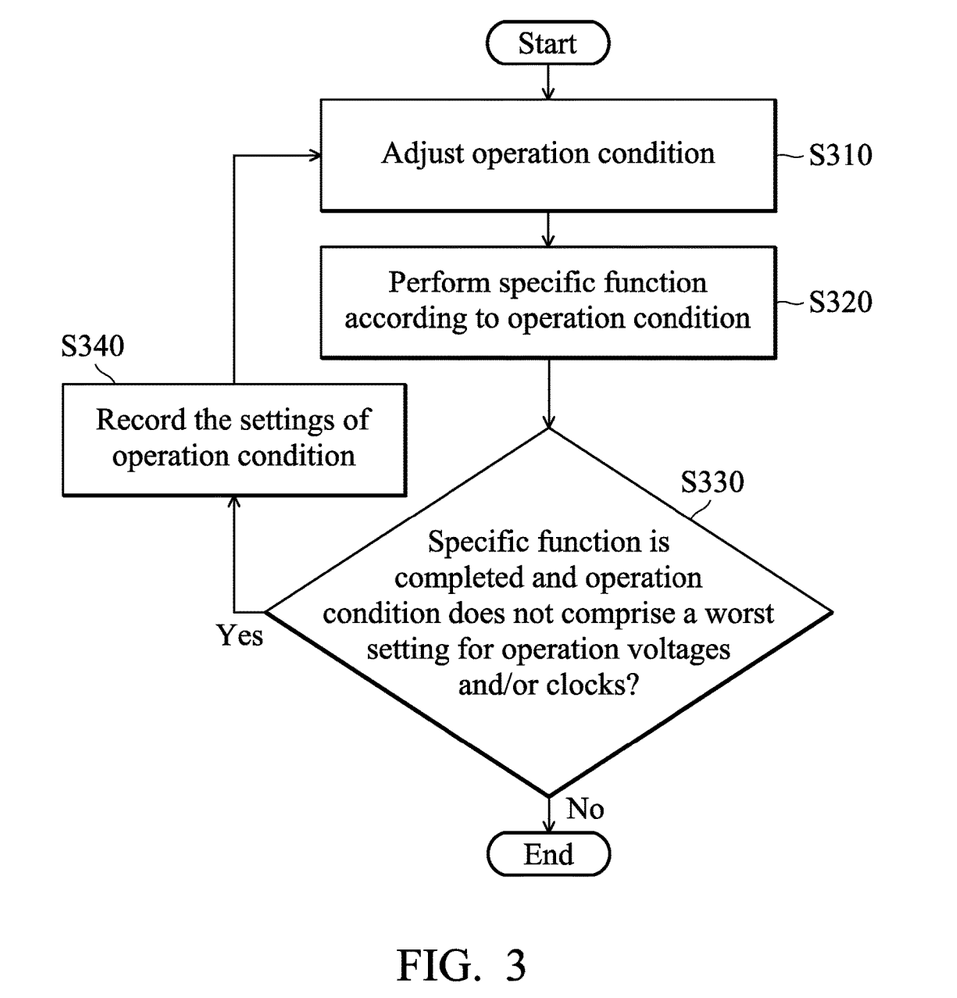
FIG. 3 shows a flow chart of the calibration procedure performed in step S230 of FIG. 2 according to an embodiment of the invention.

FIG. 3 shows a flow chart of the calibration procedure performed in step S230 of FIG. 2 according to an embodiment of the invention. As described above, in the calibration procedure, a specific function is performed to verify whether the target circuits of the portable device are normal according to an operation condition regarding the operation voltages and/or the operation clocks of the target circuits. Referring to FIG. 1 and FIG. 3 together, first, in step S310, the first processor 110 respectively provides the control signals CTRL1 and CTRL2 to the power module 130 and the clock module 140, so as to adjust the operation condition. For example, in response to the control signal CTRL1, the power module 130 can decrease the operation voltage VDD1 of the first processor 110 from the initial voltage value V1_0 to the voltage value V1_1. Moreover, in response to the control signal CTRL2, the clock module 140 can decrease the operation clock CLK1 of the first processor 110 from the initial frequency value F1_0 to the frequency value F1_1. In one embodiment, the first processor 110 adjusts the operation condition by only providing the control signal CTRL1 to the power module 130 or the control signal CTRL2 to the clock module 140, i.e. only the operation voltage or the operation clock is adjusted. In some embodiments, the first processor 110 further provides the control signals CTRL1 and CTRL2 to the second processor 120, thus the second processor 120 can obtain the current settings of the adjusted operation condition. Next, the first processor 110 performs a specific function according to the adjusted operation condition (step S320), such as the operation voltage VDD1 with the voltage value V1_1 and the operation clock CLK1 with the frequency value F1_1. In some embodiments, the specific function is created by using design customized functional patterns (FP). Furthermore, when the specific function is performed by the first processor 110, the second processor 120 will monitor the operation status of the specific function according to the adjusted operation condition. For example, the second processor 120 can use a watch dog circuit to detect whether the specific function is completed during a specific time period. Next, in step S330, the second processor 120 determines whether the specific function is completed during the specific time period, and further determines whether the adjusted operation condition does not comprise a worst setting for the operation voltages and/or the operation clocks of the portable device 100. If the specific function has not been completed during the specific time period, the second processor 120 determines that calibration procedure has failed, and then the second processor 120 resets the first processor 110 (step S240 of FIG. 2) for subsequent processes. If the specific function is completed during the specific time period and the adjusted operation condition comprises a worst setting of the operation voltages and/or the operation clocks of the target circuits to be calibrated, the second processor 120 determines that the target circuits are calibrated completely in the calibration procedure, and then the second processor 120 resets the first processor 110 (step S240 of FIG. 2) for subsequent processes. Conversely, If the specific function is completed during the specific time period and the adjusted operation condition does not comprise the worst setting of the operation voltages and/or the operation clocks of the target circuits to be calibrated, the second processor 120 records the settings of the current operation condition (step S340) by storing the current voltage value of the operation voltages and the current frequency values of the operation clocks into the storage unit 160. After the second processor 120 notifies the first processor 110 that the settings of the current operation condition has been recorded, the first processor 110 adjusts the operation condition again by respectively providing the control signals CTRL1 and CTRL2 to the power module 130 and the clock module 140 (step S310). For example, in response to the control signal CTRL1, the power module 130 can decrease the operation voltage VDD1 of the first processor 110 from the voltage value V1_1 to the voltage value V1_2. Moreover, in response to the control signal CTRL2, the clock module 140 can decrease the operation clock CLK1 of the first processor 110 from the frequency value F1_1 to the frequency value F1_2. Next, the first processor 110 performs the specific function again according to the adjusted operation condition (step S320), such as the operation voltage VDD1 with the voltage value V1_2 and the operation clock CLK1 with the frequency value F1_2. Similarly, the second processor 120 will monitor the operation status of the specific function according to the adjusted operation condition (step S330). Specifically, the calibration procedure is performed by gradually adjusting the operation condition and performing the steps S310-S340 in a loop until the second processor 120 determines that the calibration procedure has succeeded or failed.

Figure 4:
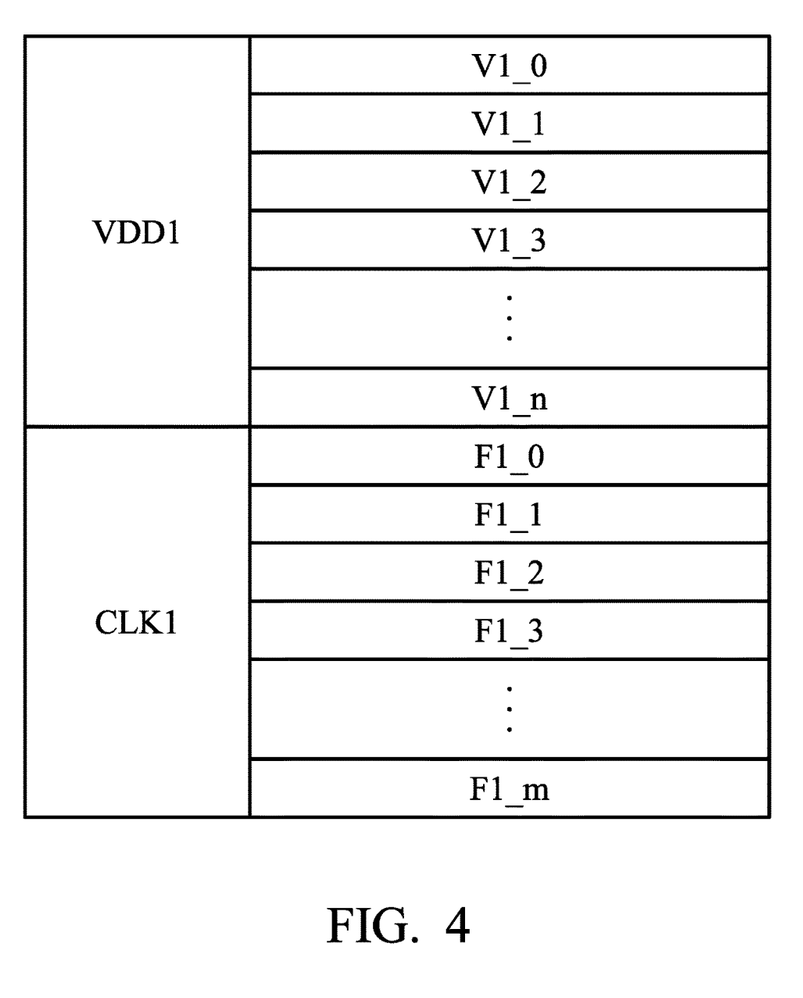
FIG. 4 shows an example illustrating a setting table of the operation voltage VDD1 and the operation clock CLK1 of the first processor of FIG. 1 according to an embodiment of the invention.

FIG. 4 shows an example illustrating a setting table of the operation voltage VDD1 and the operation clock CLK1 of the first processor 110 of FIG. 1 according to an embodiment of the invention. Referring to FIG. 1 and FIG. 4 together, the voltage values of the operation voltage VDD1 comprise V1_0, V1_1, V1_2, . . . , V1_n, where V1_0>V1_1>V1_2> . . . >V1_n. The voltage values V1_0 through V1_n are determined according to system specifications of the portable device 100. In the embodiment, the voltage value V1_0 is an initial voltage value and the frequency value F1_0 is an initial frequency value. Furthermore, the frequency values of the operation clock CLK1 comprise F1_0, F1_1, F1_2, . . . , F1_m, where F1_0>F1_1>F1_2> . . . >F1_m. The frequency values F1_0 through F1_m are determined according to system specifications of the portable device 100. As described above, the first processor 110 can perform an initial procedure according to the operation voltage VDD1 with the initial voltage value V1_0 and the operation clock CLK1 with the initial frequency value F1_0. In a calibration procedure, the operation voltage VDD1 is gradually decreased from the initial voltage value V1_0 to the voltage value V1_n, wherein the voltage value V1_n is an ideal lowest voltage value (a threshold value) that the first processor 110 can operate normally. Furthermore, the operation clock CLK1 is gradually decreased from the initial frequency value F1_0 to the frequency value F1_m, wherein the frequency value F1_m is an ideal lowest frequency value that the first processor 110 can operate normally. By performing the calibration procedure, the actual lowest voltage value and the actual lowest frequency value can be obtained for the first processor 110. For example, if a specific function of the calibration procedure performed by the first processor 110 has succeeded according to the operation voltage VDD1 with the frequency value V1_2 and a specific function of the calibration procedure performed by the first processor 110 has failed according to the operation voltage VDD1 with the frequency value V1_3, it is determined that the actual lowest voltage value is V1_2 and then the actual lowest voltage value is recorded in the storage unit 160. Thus, the portable device 100 can avoid using voltage values (e.g. V1_3-V1_n) that are lower than the actual lowest voltage value to perform the normal process, thereby the portable device 100 is stable when performing various normal applications. Thus, instability and irresponsiveness of the portable device 100 caused by the voltage values being lower than the actual lowest voltage value can be avoided.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising:
    a first processor, performing an initial procedure according to an operation clock with a first frequency value and an operation voltage with a first voltage value, and performing a calibration procedure according to the operation clock with a second frequency value and the operation voltage with a second voltage value when the initial procedure has been performed and a self-calibration event is present;
    a storage unit; and
    a second processor, detecting whether a specific function of the calibration procedure is being performed by the first processor,
    wherein the second processor stores the second frequency value and the second voltage value into the storage unit after the calibration procedure is performed,
    wherein the second voltage value is lower than the first voltage value, and the second frequency value is lower than the first frequency value.

2. The portable device as claimed in claim 1, wherein after the second frequency value and the second voltage value are stored in the storage unit, the second processor resets the first processor to perform a normal boot procedure, and the first processor performs the normal boot procedure according to the operation clock with the stored second frequency value and the operation voltage with the stored second voltage value.

3. The portable device as claimed in claim 1, wherein when the second processor detects that the specific function of the calibration procedure has not been completed during a specific time period, the second processor resets the first processor to perform a normal boot procedure, and the first processor performs the normal boot procedure according to the operation clock with a third frequency value and the operation voltage with a third voltage value.

4. The portable device as claimed in claim 3, wherein the third frequency value and the third voltage value are stored in the storage unit, and the third voltage value is greater than the second voltage value.

5. The portable device as claimed in claim 1, further comprising:
    a DRAM, storing a program code corresponding to the calibration procedure;
    a power management module, providing the operation voltage according to a first control signal from the first processor; and
    a clock module, providing the operation clock according to a second control signal from the first processor,
    wherein the first processor provides the first control signal and the second control signal according to the program code stored in the DRAM.

6. The portable device as claimed in claim 1, wherein the self-calibration event is present when a time interval between a previous initial procedure and the initial procedure exceeds a specific time interval, or an ambient temperature is outside a specific temperature range.

7. A calibration method for a portable device, comprising:
    performing a specific function of a calibration procedure with a first operation voltage, by a first processor of the portable device, when the portable device is powered on and a self-calibration event is present;
    decreasing the first operation voltage via a power module of the portable device, performed by the first processor;
    performing the specific function of the calibration procedure with the decreased first operation voltage until the decreased first operation voltage is equal to a threshold value, performed by the first processor; and
    resetting the first processor using a second processor of the portable device when the specific function of the calibration procedure has been performed with the decreased first operation voltage equal to the threshold value or the specific function of the calibration procedure has not been completed during a specific time period,
    wherein the first processor is reset to perform a normal boot procedure.

8. The calibration method as claimed in claim 7, further comprising:
storing the first operation voltage into a storage unit after the specific function of the calibration procedure has been performed with the first operation voltage, performed by the first processor,
wherein the first operation voltage is decreased after the first operation voltage is stored into the storage unit.

9. The calibration method as claimed in claim 8, further comprising:
performing a normal application according to the stored first operation voltage after the normal boot procedure has been performed.

10. The calibration method as claimed in claim 7, further comprising:
detecting whether the specific function of the calibration procedure is being performed in the specific time period, wherein the detecting is performed by the second processor.

11. The calibration method as claimed in claim 7, wherein the step of performing the specific function of the calibration procedure with the first operation voltage, performed by the first processor of the portable device, when the portable device is powered on and the self-calibration event is present further comprises:
performing an initial procedure with a second operation voltage that is higher than the first operation voltage, performed by the first processor, when the portable device is powered on;
determining whether the self-calibration event is present, performed by the first processor, when the initial procedure is performed; and
performing the specific function of the calibration procedure with the first operation voltage, performed by the first processor, when determining the self-calibration event is present.

12. The calibration method as claimed in claim 11, wherein the step of determining whether the self-calibration event is present, performed by the first processor, when the initial procedure is performed further comprises:
detecting a time interval between a previous initial procedure and the initial procedure;
detecting an ambient temperature,
wherein the self-calibration event is present when the time interval between a previous initial procedure and the initial procedure exceeds a specific time interval, or the ambient temperature is outside a specific temperature range.

13. A calibration method for a portable device, comprising:
performing an initial procedure according to a first operation voltage, via a first processor of the portable device, when the portable device is powered on;
performing a specific function of a calibration procedure according to a second operation voltage, performed by the first processor, when the initial procedure is performed and a self-calibration event is present;
decreasing the second operation voltage, performed by the first processor, when the specific function of the calibration procedure has been performed;
again performing the specific function of the calibration procedure according the decreased second operation voltage, performed by the first processor, when the decreased second operation voltage is greater than a threshold value;
detecting whether the decreased second operation voltage is equal to the threshold value, by a second processor of the portable device;
detecting whether the specific function of the calibration procedure has been completed during a specific time period, performed by the second processor; and
resetting the first processor performed by the second processor when the specific function of the calibration procedure has been performed according to the decreased second operation voltage equal to the threshold value or the specific function of the calibration procedure has not been completed during the specific time period,
wherein the first processor is reset to perform a normal boot procedure.

14. The calibration method as claimed in claim 13, further comprising:
storing the second operation voltage into a storage unit of the portable device after the specific function of the calibration procedure has been performed with the second operation voltage, performed by the first processor.

15. The calibration method as claimed in claim 14, wherein the step performed by the first processor of decreasing the second operation voltage when the specific function of the calibration procedure has been performed further comprises:
decreasing the second operation voltage, performed by the first processor, when the specific function of the calibration procedure has been performed and the second operation voltage is stored into the storage unit.

16. The calibration method as claimed in claim 14, further comprising:
performing a normal application according to the stored second operation voltage after the normal boot procedure has been performed.

17. The calibration method as claimed in claim 13, further comprising:
determining whether the self-calibration event is present, performed by the first processor, when the initial procedure is performed.

18. The calibration method as claimed in claim 17, wherein the step of determining whether the self-calibration event is present, performed by the first processor, when the initial procedure is performed further comprises:
detecting a time interval between a previous initial procedure and the initial procedure,
wherein the self-calibration event is present when the time interval between a previous initial procedure and the initial procedure exceeds a specific time interval.

19. The calibration method as claimed in claim 17, wherein the step of determining whether the self-calibration event is present, performed by the first processor, when the initial procedure is performed further comprises:
detecting an ambient temperature,
wherein the self-calibration event is present when the ambient temperature is outside a specific temperature range.

20. The calibration method as claimed in claim 13, wherein the first operation voltage is higher than the second operation voltage.

* * * * *